(12) United States Patent
Park et al.

(10) Patent No.: US 9,140,829 B2
(45) Date of Patent: Sep. 22, 2015

(54) APPARATUS FOR FABRICATING LIGHT GUIDE PANEL AND BACKLIGHT UNIT HAVING THE LIGHT GUIDE PANEL

(75) Inventors: Jae-Hyun Park, Busan (KR); Gi-Bin Kim, Paju-si (KR); Young-Sik Oh, Paju-si (KR); Sun-Man Kim, Namyangju-si (KR); Min-Soo Park, Anyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 1108 days.

(21) Appl. No.: 12/977,175

(22) Filed: Dec. 23, 2010

(65) Prior Publication Data

US 2012/0008341 A1    Jan. 12, 2012

(30) Foreign Application Priority Data

Jul. 6, 2010  (KR) .......................... 10-2010-0064761
Sep. 20, 2010  (KR) .......................... 10-2010-0092488

(51) Int. Cl.
*G02B 5/02* (2006.01)
*G02F 1/1335* (2006.01)
*F21V 8/00* (2006.01)

(52) U.S. Cl.
CPC ............ *G02B 5/0221* (2013.01); *G02B 5/0231* (2013.01); *G02B 5/0242* (2013.01); *G02B 5/0278* (2013.01); *G02B 6/0038* (2013.01); *G02B 6/0065* (2013.01); *G02B 6/0036* (2013.01); *G02B 6/0051* (2013.01); *G02B 6/0053* (2013.01); *G02F 1/133615* (2013.01)

(58) Field of Classification Search
CPC .... G02B 6/0053; G02B 5/045; G02B 6/0036; G02B 6/0016; G02B 6/0031; G02B 6/0076; G02B 6/0043; G02B 5/0221; G02B 6/0065; G02B 5/0278; G02B 5/0231; G02B 5/0242; G02B 6/0038; G02B 6/0051; G02F 1/133615
USPC ............... 362/615–627, 97.1–97.4, 606, 607, 362/339; 349/57; 345/102; 396/384
See application file for complete search history.

(56) References Cited

U.S. PATENT DOCUMENTS 5,999,685 A * 12/1999 Goto et al. ..................... 385/146
6,425,673 B1 * 7/2002 Suga et al. ..................... 362/613
(Continued)

FOREIGN PATENT DOCUMENTS

CN    1637523 A    7/2005
CN    101038392 A   9/2007
(Continued)

*Primary Examiner* — Stephen F Husar
*Assistant Examiner* — Danielle Allen
(74) *Attorney, Agent, or Firm* — Birch, Stewart, Kolasch & Birch, LLP

(57) ABSTRACT

The present invention relates to an apparatus for fabricating a light guide panel which can improve light efficiency and brightness, and a backlight unit having the light guide panel. The backlight unit includes a light source for generating a light, and a light guide panel for guiding the light incident thereon from the light source, the light guide panel having an upper pattern which is formed on a front side thereof for emitting the light guided thus to upward and a lower pattern which is formed on a backside thereof for reflecting or refracting the light, wherein the lower pattern of the light guide panel is formed in an intaglio pattern having a vertical angle at which two inclined planes meet, and one of the two inclined planes the light from the light source incident thereon has an angle of 45~55°.

13 Claims, 25 Drawing Sheets

(56) References Cited

U.S. PATENT DOCUMENTS

| | | |
|---|---|---|
| 7,530,721 B2 * | 5/2009 | Mi et al. .................. 362/606 |
| 7,632,001 B2 | 12/2009 | Hamada et al. |
| 2003/0063234 A1 * | 4/2003 | Oda et al. .................. 349/65 |
| 2006/0050531 A1 * | 3/2006 | Tsuda .................. 362/609 |
| 2007/0127268 A1 * | 6/2007 | Chen .................. 362/630 |
| 2008/0310171 A1 * | 12/2008 | Hiraishi et al. .................. 362/339 |
| 2010/0165254 A1 * | 7/2010 | Lee et al. .................. 349/65 |

FOREIGN PATENT DOCUMENTS

| | | |
|---|---|---|
| CN | 101435951 A | 5/2009 |
| JP | 2007-334151 A | 12/2007 |
| KR | 10-2006-0116566 A | 11/2006 |
| KR | 10-0774581 | 1/2007 |
| KR | 10-2007-0076795 A | 7/2007 |
| KR | 10-2007-0112576 A | 11/2007 |
| KR | 10-0790499 B1 | 1/2008 |
| TW | 200533963 | 10/2005 |

* cited by examiner

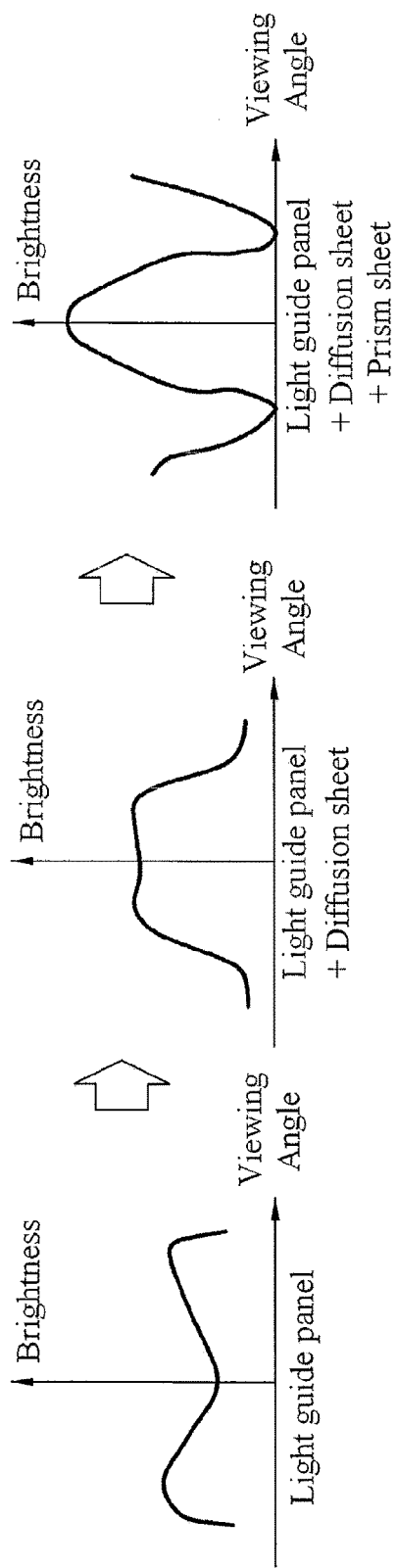

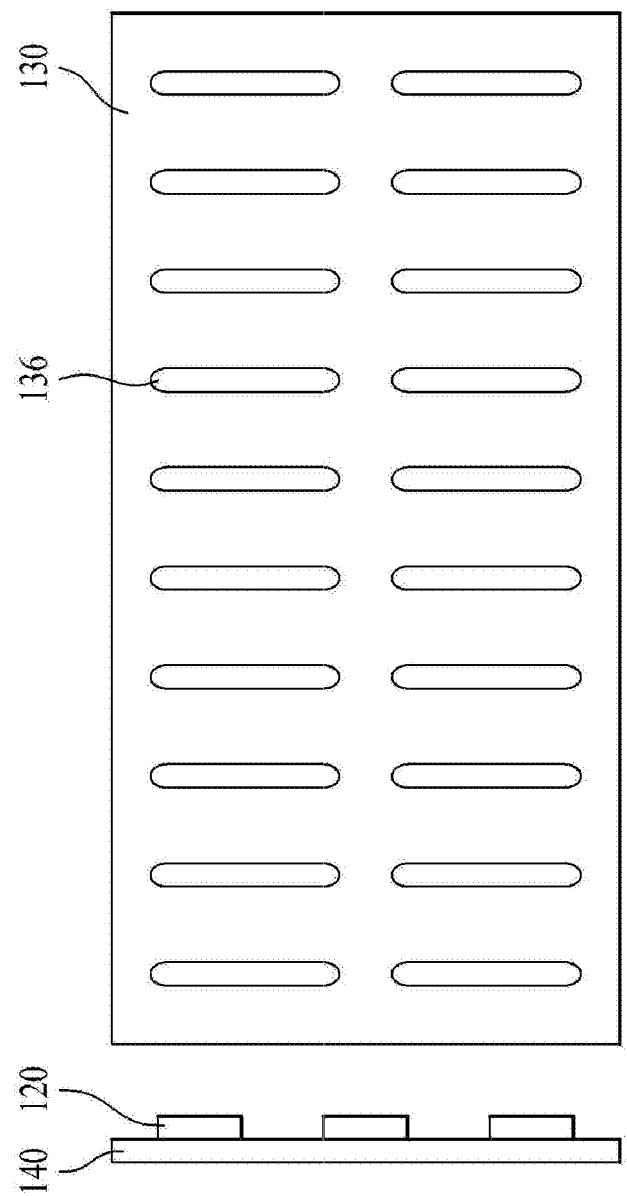

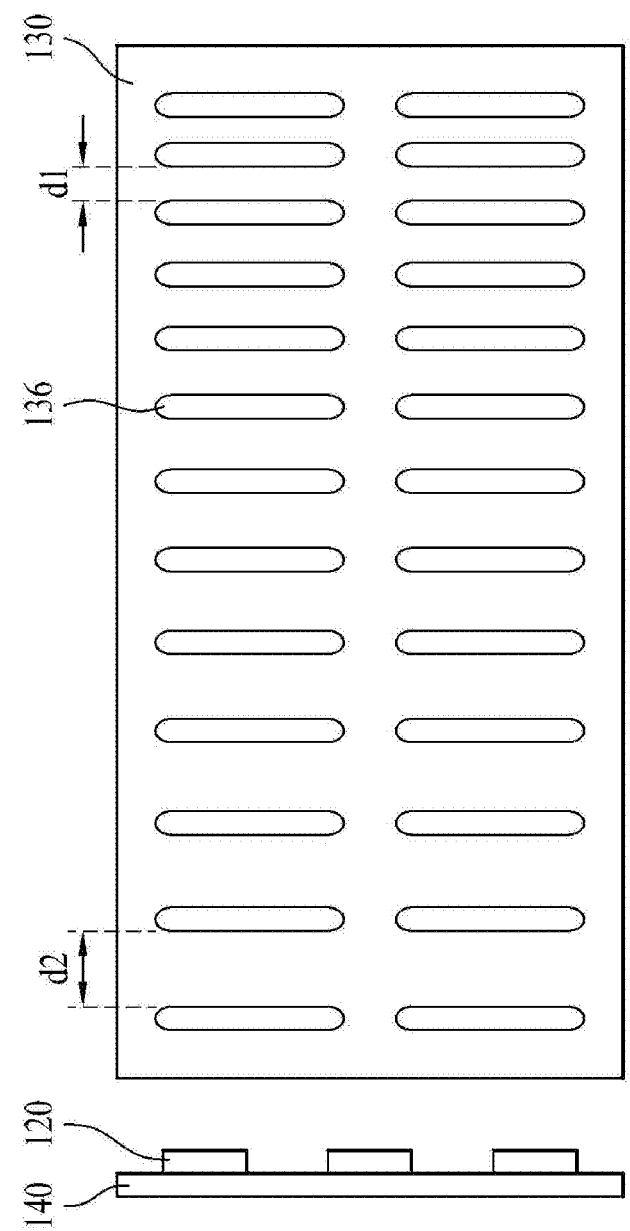

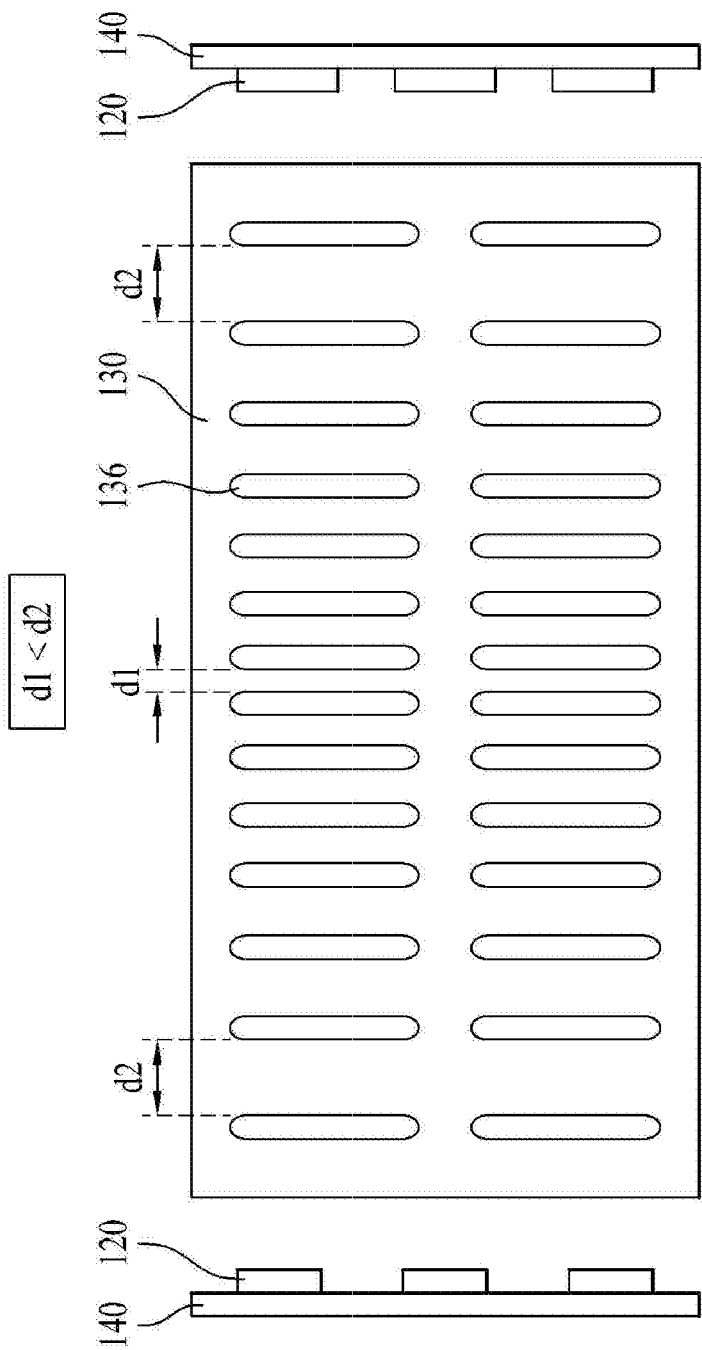

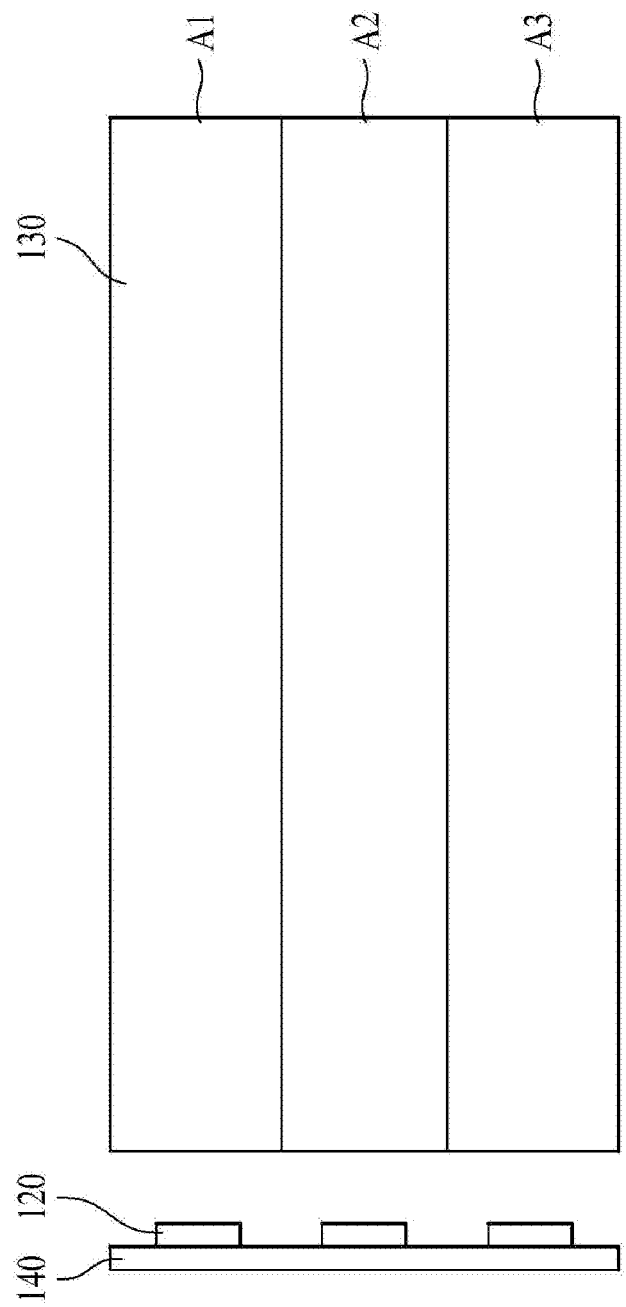

APPARATUS FOR FABRICATING LIGHT GUIDE PANEL AND BACKLIGHT UNIT HAVING THE LIGHT GUIDE PANEL

CROSS REFERENCE TO RELATED APPLICATION

This application claims the priority benefit of the Korean Patent Application No. 10-2010-0064761 filed on Jul. 6, 2010, and No. 10-2010-0092488 filed on Sep. 20, 2010. All of these application are hereby incorporated by reference as if fully set forth herein.

BACKGROUND OF THE DISCLOSURE

1. Field of the Disclosure

The present invention relates to an apparatus for fabricating a light guide panel which can improve light efficiency and brightness, and a backlight unit having the light guide panel.

2. Discussion of the Related Art

In general, as one of flat display devices which displays an image by using liquid crystals, a liquid crystal display device is used widely throughout industries owing to advantages that the liquid crystal display device is thinner, and lighter, and has a lower driving voltage, and a lower power consumption than other display devices.

Since a liquid crystal panel of the liquid crystal display device, which is to display the image, is a non-light emitting device which can not emit a light for the liquid crystal panel itself, the liquid crystal panel requires the backlight unit for supplying the light.

Referring to FIG. 1A, a light guide panel 12 of the backlight unit has an ink pattern 16 printed on a surface. The ink pattern 16 scatters the light totally reflected at, and traveling in, an inside of the light guide panel 12 to emits to an outside of the light guide panel 12, and a reflective sheet 14 or a diffusion sheet scatters or focuses the light for enhancing the brightness of the light. In this instance, since an angle of emission from the light guide panel 12 is 65~85° which is very large due to a difference of refractive indices between the light guide panel 12 and air, adjustment of the angle is difficult. As shown in FIG. 1B, in order to make the brightness of the light emitted at the large angel higher by converging the light, a light distribution is adjusted such that the brightness is high at a zero degree of the light emission angle by using the diffusion sheet and a prism sheet.

Thus, a related art backlight unit has a problem in that a change of the light distribution dependent on the diffusion sheet and the prism sheet is required due to difficulty of a light emission distribution adjustment only with the light guide panel 12, causing problems of cost increase and total thickness increase of the backlight unit due to provision of the diffusion sheet and the prism sheet.

Moreover, a very low ink pattern 16 of few μm on the related art light guide panel 12 makes the light emission angle adjustment very difficult.

SUMMARY OF THE DISCLOSURE

Accordingly, the present invention is directed to an apparatus for fabricating a light guide panel and a backlight unit having the light guide panel.

An object of the present invention is to provide an apparatus for fabricating a light guide panel which can improve light efficiency and luminance and a backlight unit having the light guide panel.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit includes a light source for generating a light, and a light guide panel for guiding the light incident thereon from the light source, the light guide panel having an upper pattern which is formed on a front side thereof for emitting the light guided thus to upward and a lower pattern which is formed on a backside thereof for reflecting or refracting the light, wherein the lower pattern of the light guide panel is formed in an intaglio pattern having a vertical angle at which two inclined planes meet, and one of the two inclined planes the light from the light source incident thereon has an angle of 45~55°.

The lower pattern is formed to have a smooth and flat surface by directing a laser beam to an extrusion plate.

The lower pattern has a length of 600~800 μm, a width of 50~300 μm, and a height of 50~150 μm.

The inclined planes of the lower pattern are arranged perpendicular to a direction of travel of the light in the light guide panel, and a length direction of the lower pattern is parallel to a direction of arrangement of the light source.

The upper pattern is formed in a lenticular shape perpendicular to the length direction of the lower pattern, and has a ratio of a height to a width of 0.06~0.99.

The lower patterns are formed to have a concentration which becomes the higher as the lower patterns go the farther from the light source.

In a case the light source is positioned on one side of the light guide panel, spacing of the lower patterns becomes the smaller as the lower patterns go from a light incident portion of the light guide panel to a light reflex portion of the light guide panel, and in a case the light source is positioned on opposite sides of the light guide panel, spacing of the lower patterns becomes the smaller as the lower patterns go from the opposite sides of the light guide panel to a middle portion of the light guide panel.

The backlight unit further includes a prism sheet on a front of the light guide panel, wherein the prism sheet includes a base film, and a prism portion formed on a front of the base film having a continuous arrangement of mountain patterns and valley patterns each with a vertical angle of 85~95°.

The mountain pattern has a pointed or rounded peak.

The prism portion includes at least two mountain patterns having shapes different from each other.

The prism portion is formed of photo-setting resin having a liquid refractive index of 1.55~1.65.

At least any one of the two inclined planes of the mountain pattern is formed to have an angle of 0~45° to at least any one of the inclined planes of the upper pattern.

The mountain pattern and the valley pattern are arranged parallel to the upper pattern.

In another aspect of the present invention, an apparatus for fabricating a light guide panel which guides a light incident thereon from a light source, and emits the light guided thus to upward, the apparatus includes an upper pattern forming unit for forming an upper pattern on a front of the light guide panel, and a laser machine for directing a laser beam to a back side of the light guide panel to form a lower pattern which reflects or refracts the light, wherein the lower pattern is formed in an intaglio pattern having a vertical angle at which two inclined planes meet, and one of the two inclined planes the light from the light source incident thereon has an angle of 45~55°.

The lower pattern is formed to have a flat and smooth surface by directing a laser beam to an extrusion plate, and the inclined planes of the lower pattern are arranged perpendicular to a direction of travel of the light in the light guide panel, and a length direction of the lower pattern is parallel to a direction of arrangement of the light source.

The upper pattern is formed in a lenticular shape perpendicular to the length direction of the lower pattern and, the upper pattern forming unit is an extrusion roller or an imprinting mold having a recess with an inverted shape of the upper pattern.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1B illustrates schematic views showing a light distribution adjustment process by using a diffusion sheet and a prism sheet in the related art.

FIG. 6 illustrates a perspective view a lower pattern having an arrangement different from the lower pattern in FIG. 5.

FIGS. 8A and 8B illustrate diagrams showing variations of the lower pattern in FIG. 3.

FIG. 10 illustrates a diagram of a backlight unit of the present invention, driven segment by segment.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1A:
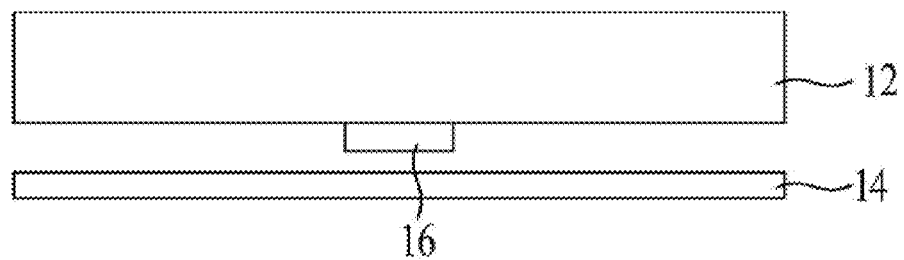
FIG. 1A illustrates a section of a related art backlight unit.
Figure 2:
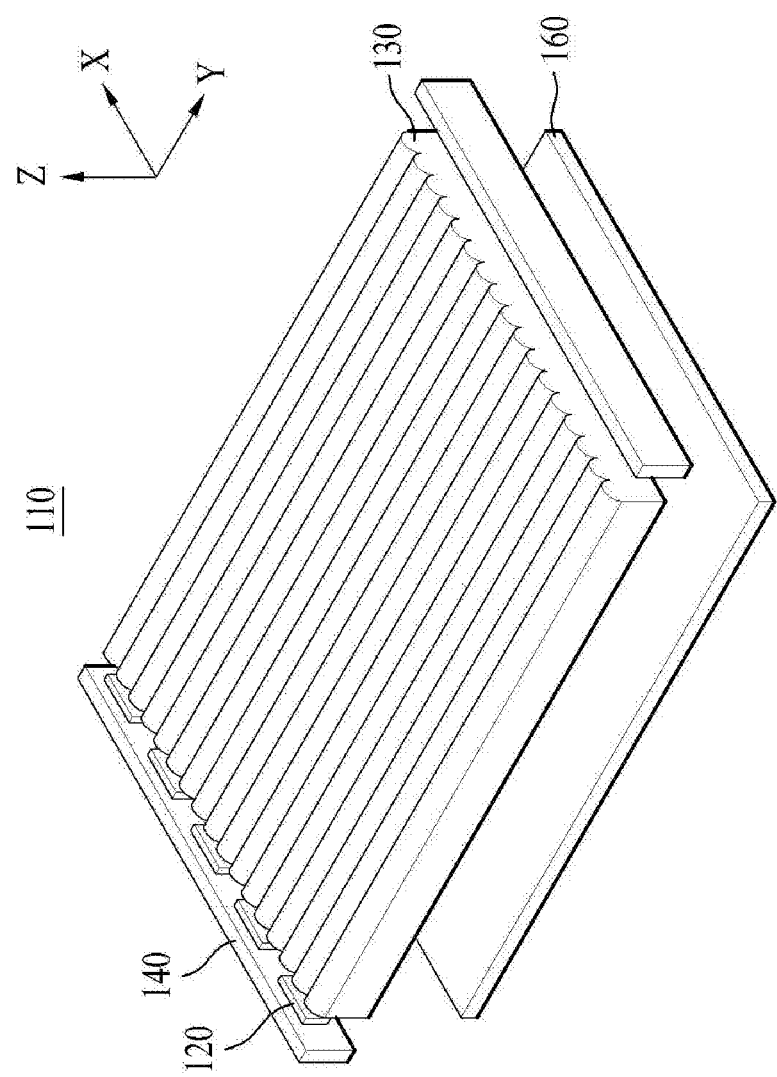
FIG. 2 illustrates a perspective view of a backlight unit in accordance with a preferred embodiment of the present invention.

FIG. 2 illustrates a perspective view of a backlight unit in accordance with a preferred embodiment of the present invention.

Referring to FIG. 2, the backlight unit 110 includes a light source 120, a light guide panel 130, and a reflective sheet 160.

The light source 120 is mounted to a light source circuit board 140 to have power applied thereto for generating a light. The light source 120 is any one of a light emitting diode LED, a cold cathode fluorescent lamp CCFL, and an external electrode fluorescent lamp EEFL. The light emitted from the light source 120 is incident on an inside of the light guide panel 130 directly, or reflected at a light source housing (not shown) formed to surround the light source 120 and is incident on the inside of the light guide panel 130.

And, the light source 120 is formed to face at least one side of the light guide panel 130. For an example, the light source 120 is formed in 2-vertical structures such that the light source 120 faces opposite end surfaces of the light guide panel 130 for reduction of power consumption and saving a cost.

The reflective sheet 160 is arranged under the light guide panel 130 for reflecting some of the light from the light source 120 emitted to an outside of the light guide panel 130 through the backside of the light guide panel 130 toward the light guide panel 130.

Figure 3:
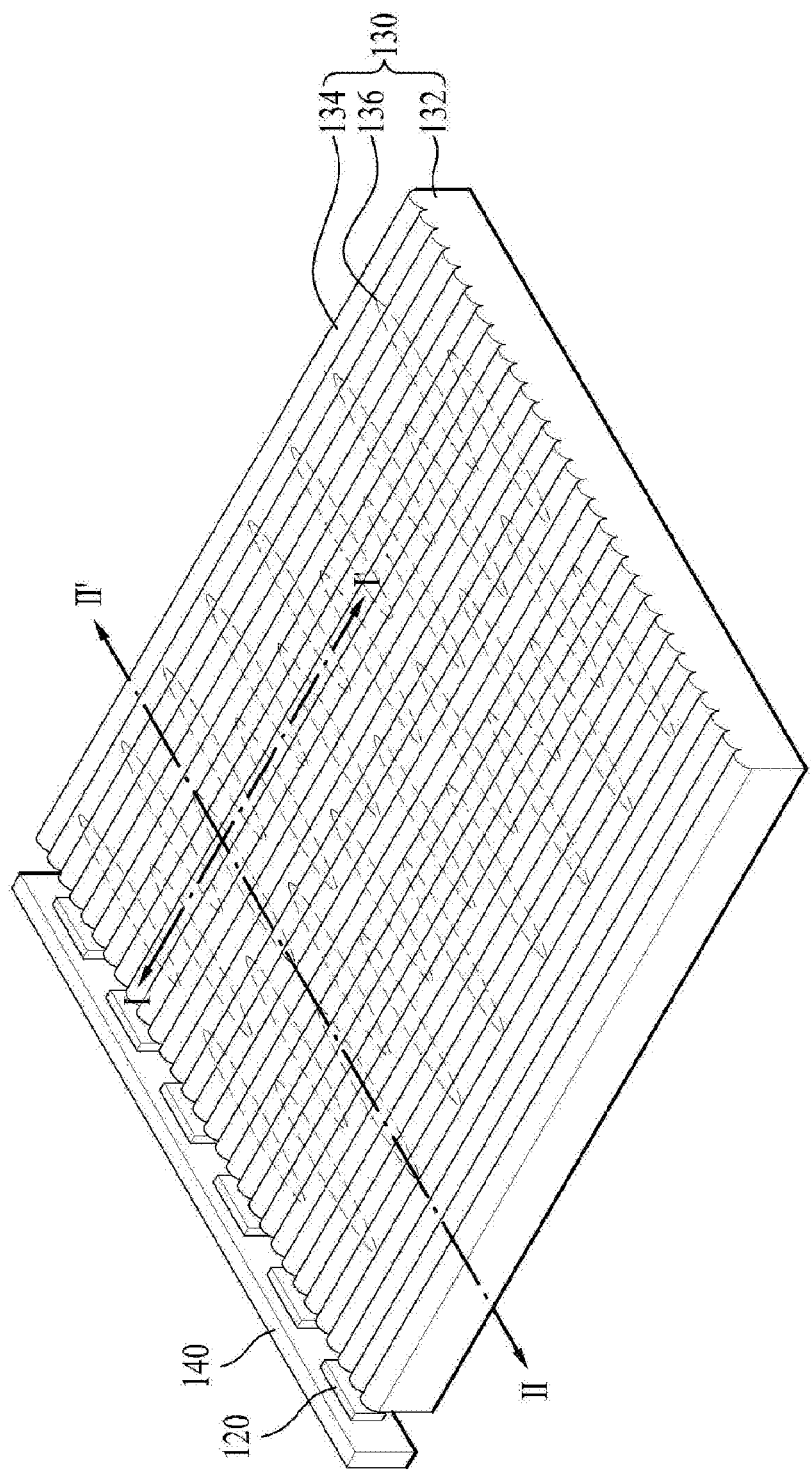
FIG. 3 illustrates a perspective view of the upper pattern and the lower pattern in FIG. 2.
Figure 4A:
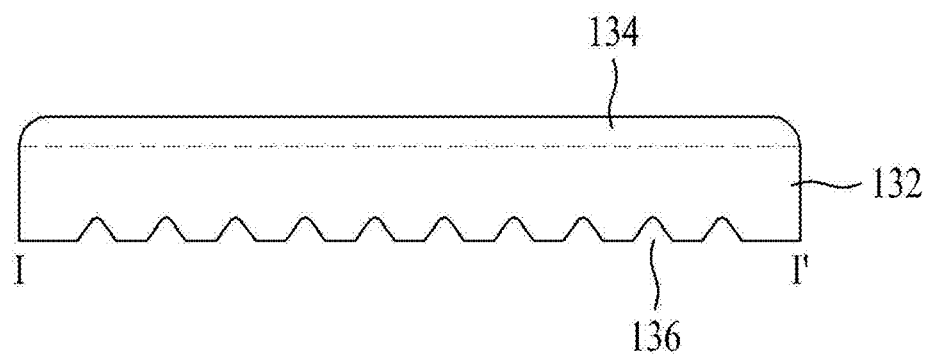
FIGS. 4A and 4B illustrate sections across lines "I-I'" and "II-II'" in FIG. 3, respectively.
Figure 4B:
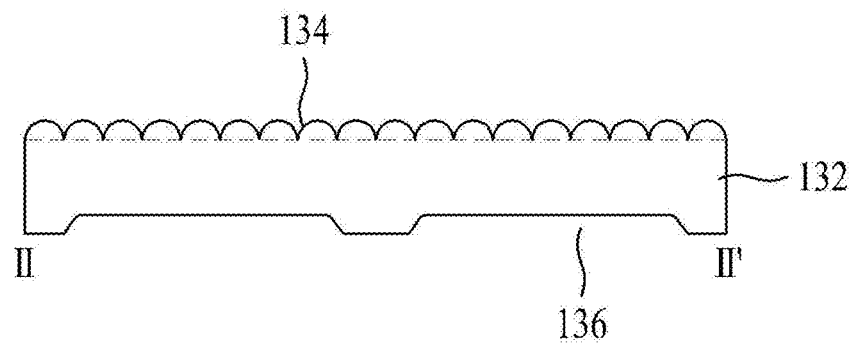

The light guide panel 130 is arranged to face the light source 120 for guiding the light incident thereon from the light source 120 and diffusing and focusing the light guided by the light guide panel 130 itself to emit from a front surface of the light guide panel 130. As shown in FIGS. 3, 4A and 4B, the light guide panel 130 has a base layer 132, an upper pattern 134, and a lower pattern 136. The base layer 132, the upper pattern 134, and the lower pattern 136 are formed of the same material as one unit. For example, the base layer 132, the upper pattern 134, and the lower pattern 136 is formed of an extrusion plate which is melted by a laser beam, for an example, polymethylmethacrylate PMMA which has a refractive index greater than air.

The base layer 132 guides the light from the light source 120 to distribute the light throughout an inside of the base layer 132, uniformly.

Figure 5:
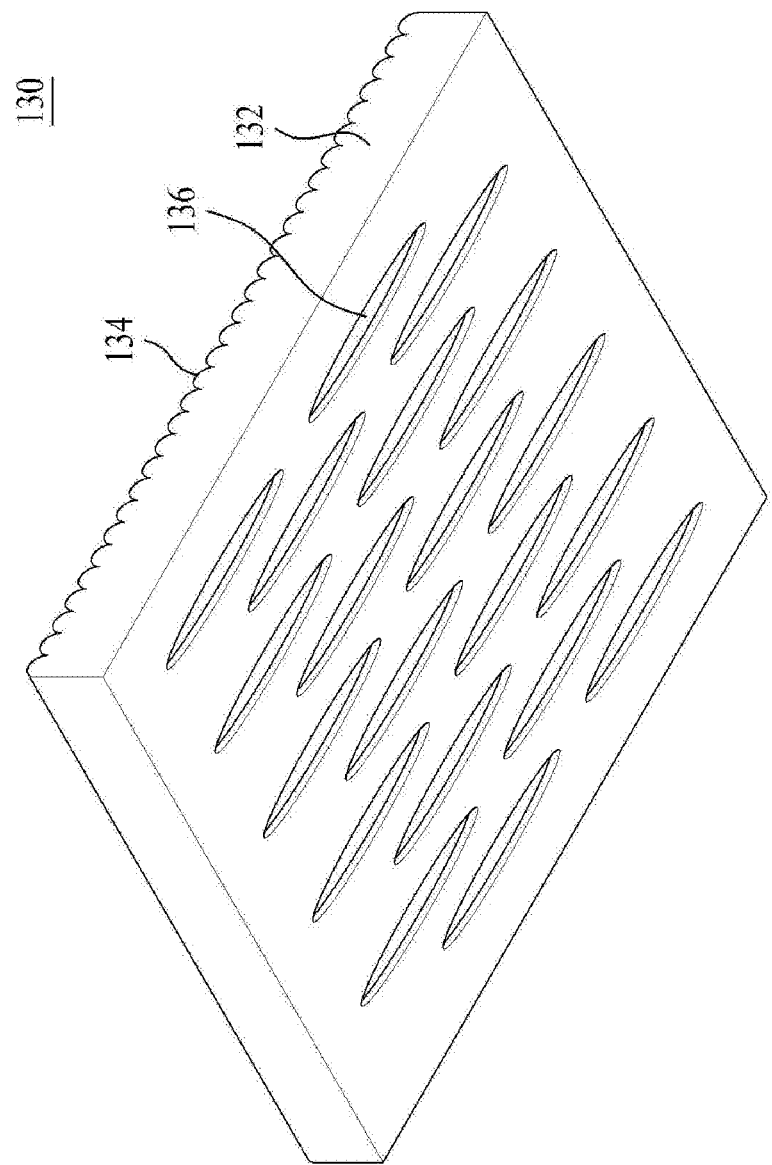
FIG. 5 illustrates a perspective view of a detail of a lower pattern of a backlight unit in accordance with a preferred embodiment of the present invention.
Figure 7A:
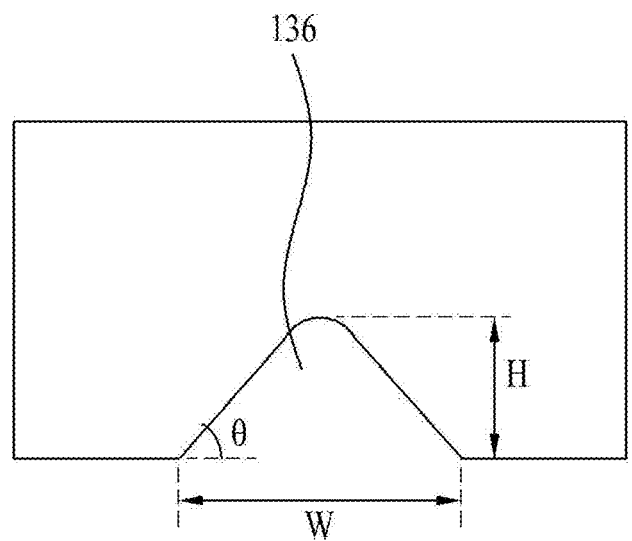
FIGS. 7A and 7B illustrate sections for explaining inclined plane angles of the lower pattern in FIG. 6, respectively.
Figure 7B:
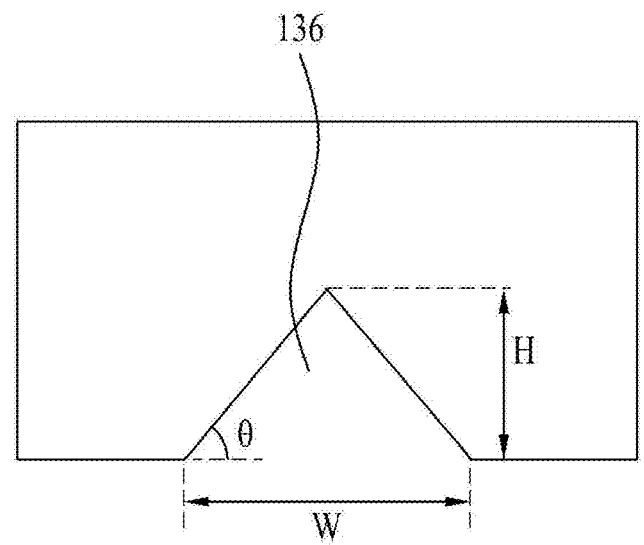

The lower patterns 136 are formed to be arranged in zigzag perpendicular to the upper pattern 134 as shown in FIG. 5, or on a line as shown in FIG. 6. The lower pattern 136 has a prismatic section of an intaglio engraved in a backside of the light guide panel 130 with a rounded vertical angle as shown in FIG. 7A or a pointed vertical angle as shown in FIG. 7B.

And, the lower patterns 136 are formed to have a concentration which becomes the higher as the lower patterns 136 go the farther from the light source 120. That is, as shown in FIG. 8A, when the light source 120 is positioned on one side of the light guide panel 130, the concentration of the lower patterns 136 becomes the higher as the lower patterns 136 go from a light incident portion of the light guide panel 130 to a light facing portion of the light guide panel 130. The light facing portion of the light guide panel 130 is opposite to the light incident portion of the light guide panel 130. According to this, spacing of the lower patterns 136 adjacent to the light facing portion of the light guide panel 130 becomes smaller than spacing between the lower patterns 136 adjacent to the light incident portion of the light guide panel 130 (d1<d2).

Referring to FIG. 8A, in a case the light source 120 is positioned on opposite sides of the light guide panel 130, the concentration of the lower patterns 136 becomes the higher as the lower patterns 136 go from the opposite sides of the light guide panel 130 to a middle portion of the light guide panel 130. According to this, spacing of the lower patterns 136 positioned at the middle portion is smaller than spacing between the lower patterns 136 adjacent to the light incident portion on the opposite sides of the light guide panel 130 (d1<d2).

The lower pattern 136 having a concentration which becomes the higher as the lower patterns 136 becomes the farther from the light source 120 prevents the light traveling in a length direction of the upper pattern 132 from leaking to other surfaces (for an example, the light reflex portion) except a light emitting surface of the light guide panel 130, thereby preventing the light from losing.

Figure 9A:
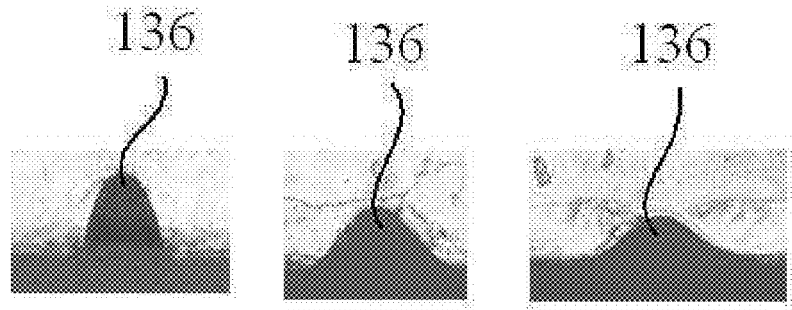
FIGS. 9A~9C illustrate diagrams for explaining inclined angles, widths, and lengths of the lower pattern of the present invention adjusted according to process conditions of a laser machining process, respectively.

The lower pattern 136 is formed by a laser machine. In this instance, the angle θ of the inclined planes of the lower pattern 136, a length L of the lower pattern 136, and a width W of the lower pattern 136 can be formed by adjusting a position of a focal point of the laser beam, a machining head moving time period, laser power output, an aperture and a focal distance of the lens. Particularly, as shown in FIG. 9A, by varying laser machining conditions, the angle of the inclined planes of the lower pattern 136 can be adjusted. In this instance, as shown in table 1, in order to make a brightness component vertical to the light guide panel 130 to be maximum, the angle θ of the inclined planes having the light from the light source 120 incident thereon is formed to be 45°~55°.

TABLE 1

| | Angle of inclined planes | | |
|---|---|---|---|
| | 30 deg. | 50 deg. | 70 deg. |
| Brightness | 16% | 100% | 24% |

In detail, referring to FIG. 8A, in a case the light source 120 is positioned on one side of the light guide panel 130, one of the two inclined planes of the lower pattern 136 facing the light source 120 has an angle of 40~55°, and as shown in FIG. 8B, in a case the light source 120 is positioned on opposite sides of the light guide panel 130, each of the two inclined planes of the lower pattern 136 has an angle of 40~55° as the two inclined planes face the light source 120 respectively, making lengths of the inclined planes adjacent to each other the same. And, an angle formed by the inclined plane of the lower pattern 136 and the backside of the light guide panel 130 is 135~140°.

Figure 9B:
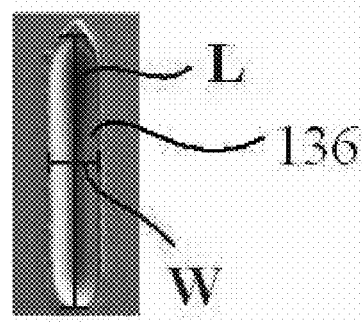

And, referring to FIG. 9B, the lower pattern 136 has a length L formed longer than a width W thereof, and a ratio H/W of a height of the lower pattern 136 to the width W of the lower pattern 136 is formed to be 0.2~0.5. For an example, the lower pattern 136 has a length L of 600~800 μm, a width W of 50~300 μm, and a height H of 10~150 μm.

Figure 9C:
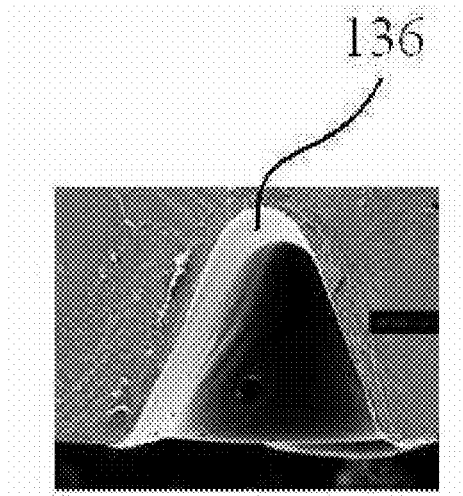

Referring to FIG. 9C, since the lower pattern 136 is formed by laser machining, the inclined plane of the lower pattern 136 also has a smooth and flat surface.

Accordingly, the light incident on the light guide panel 130 from the light source 120 and guided by the base layer 132 is reflected or refracted at the inclined plane of the lower pattern 136, and the light reflected or refracted thus proceeds toward the upper pattern 134.

The upper pattern 134 focuses the light guided by the base layer 132, and emits the light focused by the upper pattern 134 thus upward. To do this, as shown in FIGS. 4A and 4B, a plurality of the upper patterns 134 are formed in shapes of lenticular lenses arranged in a direction of arrangement of the light source 120, i.e., a Y-axis direction, respectively. The upper pattern 134 can improve the brightness by forming a light emission angle of the light guide panel 130 to be vertical to the light guide panel 130, i.e., in a direction (i.e., a Z-axis direction in FIG. 2) vertical to a direction of arrangement of the upper patterns 134.

Since the light incident on the light guide panel 130 by the upper pattern 134 proceeds in a length direction of the upper pattern 134 straightly, segmented driving of the light guide panel 130 is possible. That is, as shown in FIG. 10, the light guide panel 130 is segmented into a plurality of light guide regions A1, A2, and A3 for making segmented driving of the liquid crystal panel positioned on an upper side of a front of the backlight unit.

And, the upper pattern 134 has a height smaller than a width of the upper pattern 134. For an example, a ratio of the height of the upper pattern 134 to the width of the upper pattern 134 is formed to be 0.06~0.99. If above condition is met, since an extent of loss of the light caused by leakage of the light incident on the light incident portion of the light guide panel 130 through the light reflex portion is reduced in comparison to the related art light guide panel which causes to emit the light due to breakage of a total reflection condition, a quantity of the light emitted from the light emission portion of the light guide panel 130 can be increased. If the height becomes higher than above condition failing to meet above condition, the increase of the light emission quantity becomes insignificant.

Figure 11:
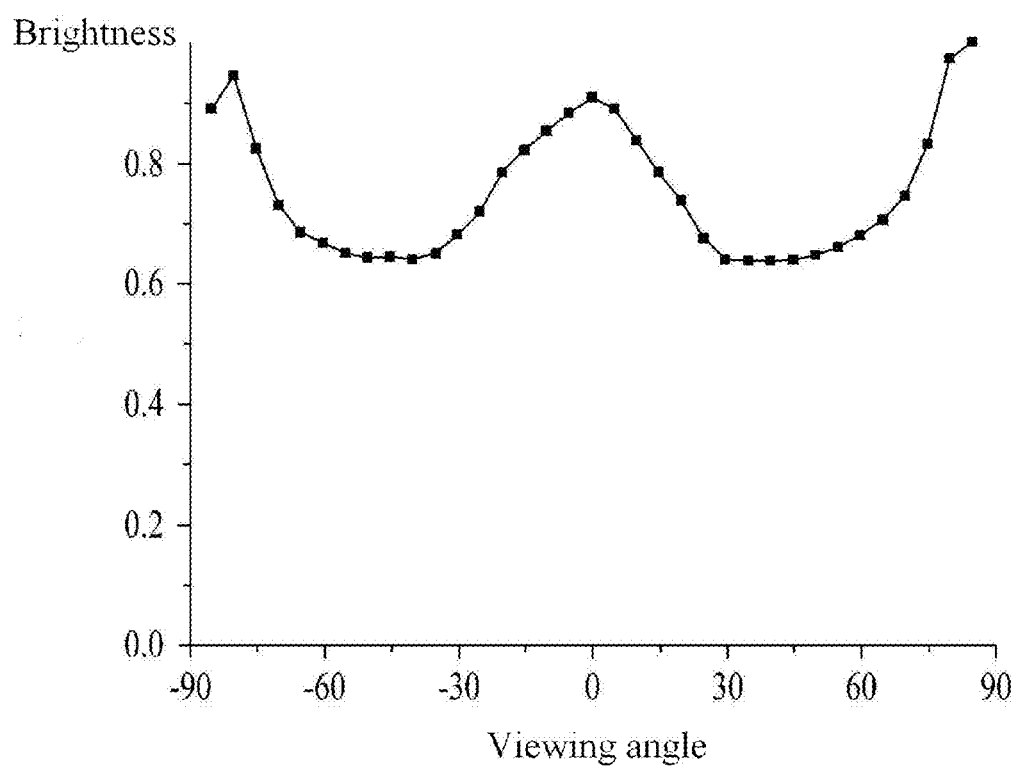
FIG. 11 illustrates a diagram showing a characteristic of a viewing angle of a light from a light guide panel in accordance with a first preferred embodiment of the present invention versus brightness.

FIG. 11 illustrates a diagram showing a characteristic of a viewing angle of a light from a light guide panel in accordance with a first preferred embodiment of the present invention versus brightness.

Referring to FIG. 11, the light guide panel 130 of the present invention shows a maximum brightness distribution at a viewing angle of 0 degree (vertical to the front of the light guide panel 130) similar to the light emission angle of the related art backlight unit having the diffusion sheet and the prism sheet. Thus, since the light guide panel 130 of the present invention shows a maximum brightness distribution at the viewing angle of 0 degree even without the related art diffusion sheet and prism sheet, costs of the diffusion sheet and prism sheet can be saved, and since a total thickness of the backlight unit can be reduced, fabrication of a thinner, and lighter liquid crystal display device becomes possible. Moreover, the light guide panel 130 of the present invention has brightness improved by more than 15% in average compared to the backlight unit having two sheets of the diffusion sheet stacked thereon.

Figure 12:
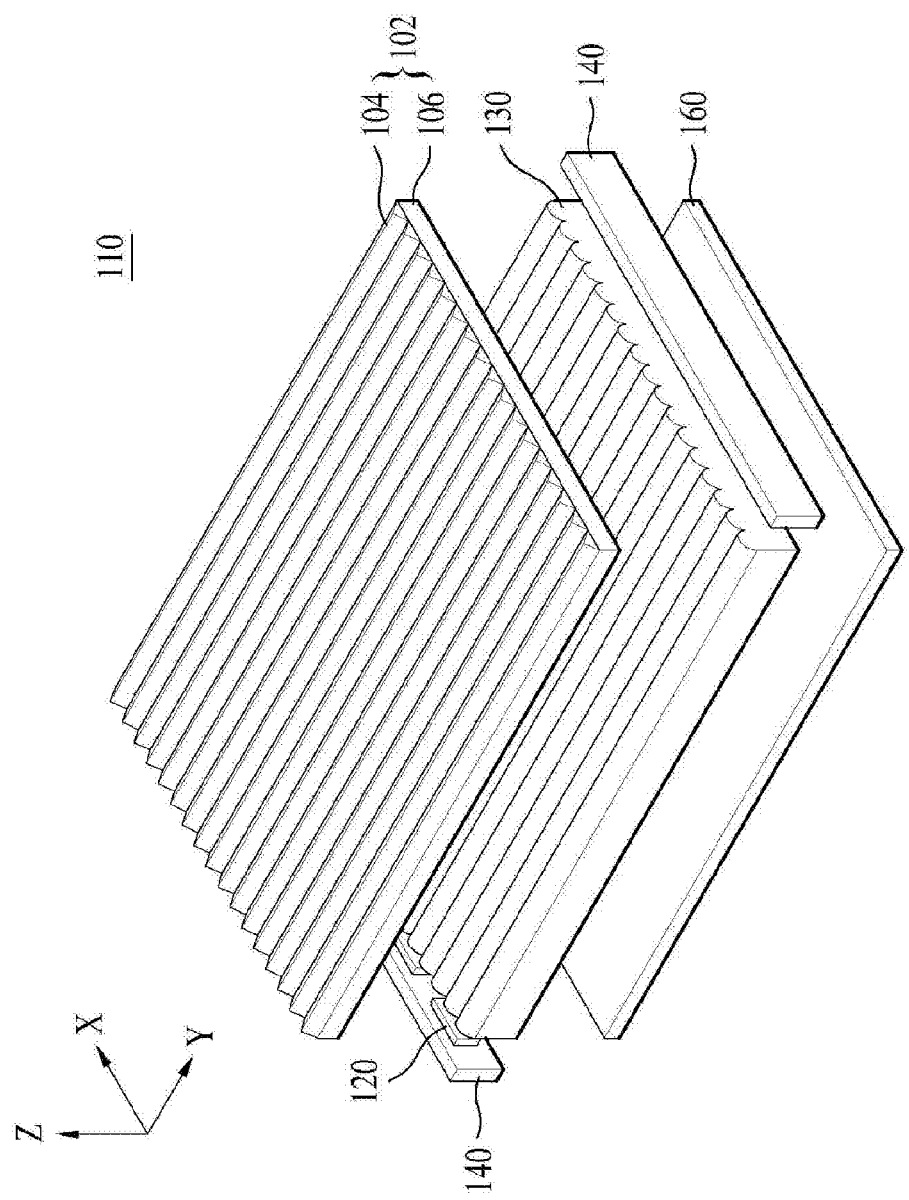
FIG. 12 illustrates a perspective view of a backlight unit in accordance with a second preferred embodiment of the present invention.

FIG. 12 illustrates a perspective view of a backlight unit in accordance with a second preferred embodiment of the present invention.

The backlight unit shown in FIG. 12 has elements identical to the backlight unit shown in FIG. 2 except a prism sheet 102 on the light guide panel 130. Accordingly, detailed description of identical elements will be omitted.

Referring to FIG. 12, the prism sheet 102 includes a base film 106, and a prism portion 104 positioned on the base film 106.

Figure 13:
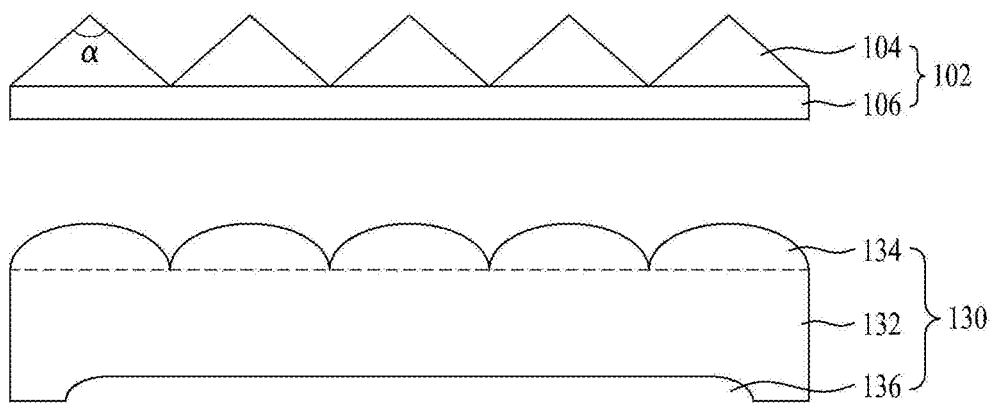
FIG. 13 illustrates a section of the backlight unit in FIG. 12.

Referring to FIG. 13, the base film 106 is positioned on the light guide panel 130 for transmitting the light from the light guide panel 130. To do this, the base film 106 is formed of a light transmissive material, such as polymethylmethacrylate PMMA, or polyethyleneterephthalate PET.

Figure 14:
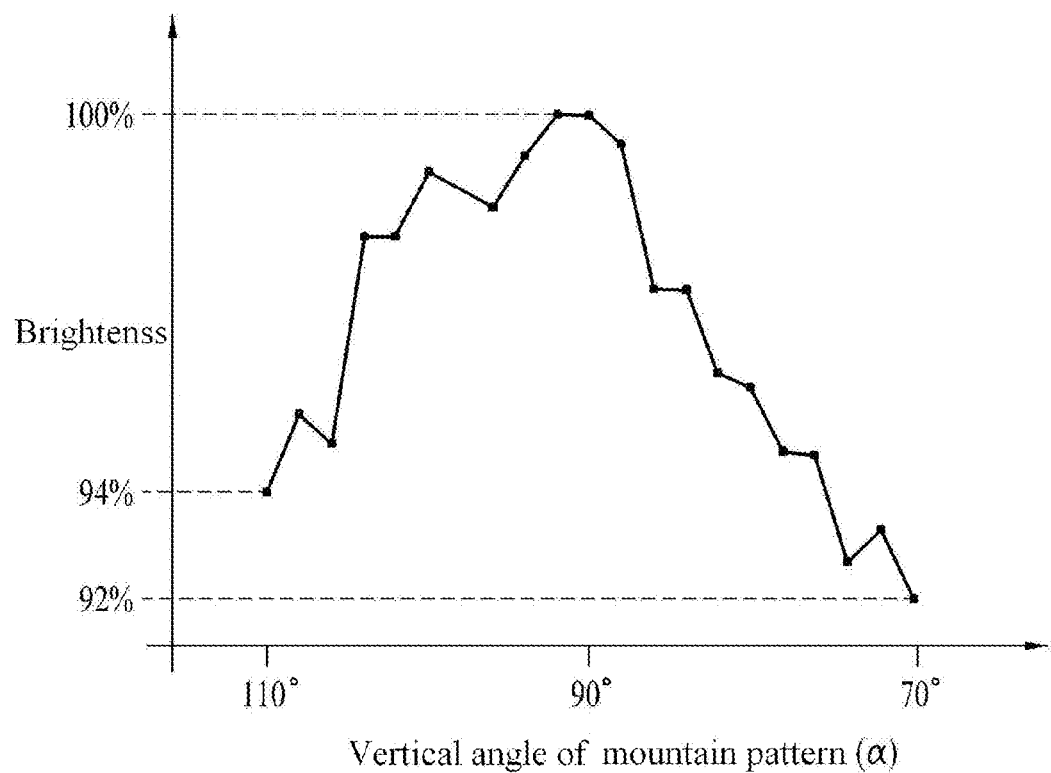
FIG. 14 illustrates a graph showing a vertical angle of the prism portion in the prism sheet in FIG. 12 versus a brightness characteristic.

The prism portion 104 focuses the light from the light guide panel 130 to enhance the brightness. The prism portion 104 is formed of a material having a refractive index different from a refractive index of the air, and similar to glass. For an example, the prism portion 104 is formed of photo-setting resin having a liquid refractive index of 1.55~1.65. The prism portion 104 has mountain patterns and valley patterns arranged in parallel to the upper patterns of the light guide panel 130. In this instance, a vertical angle α of the mountain pattern of the prism portion 104 is formed to be 85~95°. That is, as shown in FIG. 14, it can be known that, if a light emission distribution of the light guide panel 130 is vertical, the brightness is the highest when the vertical angle of the mountain pattern of the prism portion 104 is 85~95°. And, as shown in FIG. 2, it can also be known that the brightness is the highest when the angle θ of the inclined planes of the lower pattern 136 of the light guide panel 130 is 40~55°, and the mountain pattern of the prism portion 104 has a vertical angle α of 90°.

TABLE 2

| Vertical angle of the mountain pattern of the prism portion α | | 90 deg. | |
|---|---|---|---|
| Angle of inclined planes of the lower pattern | 30 deg. | 50 deg. | 70 deg. |
| Brightness | 16% | 100% | 24% |

And, at least one of the two inclined planes of the mountain pattern of the prism portion 104 forms an angle of 0~45° to at least one of the two inclined planes of the upper pattern 134 of the light guide panel 130.

Figure 15:
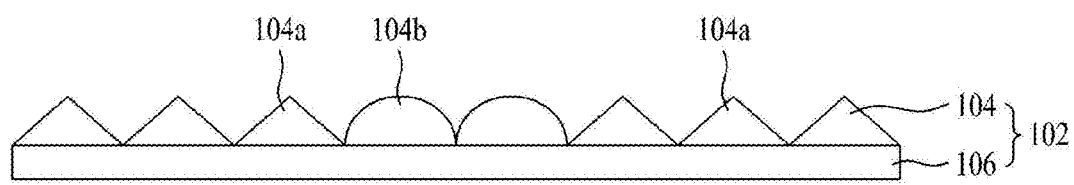
FIG. 15 illustrates a section showing a variation of the prism sheet in FIG. 12.

In the meantime, a peak of the mountain pattern of the prism portion 104 is formed to have a pointed or rounded shape, or can be formed to have at least two or more than two patterns, for an example, to have a mountain pattern 104a of the pointed shape and a mountain pattern of 104b of the rounded shape as shown in FIG. 15.

Figure 16A:
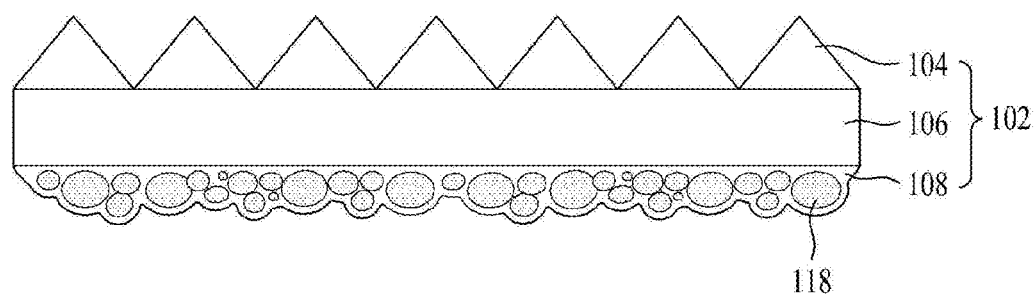
FIGS. 16A~16D illustrate sections showing prism sheets including diffusion layers, respectively.
Figure 16B:
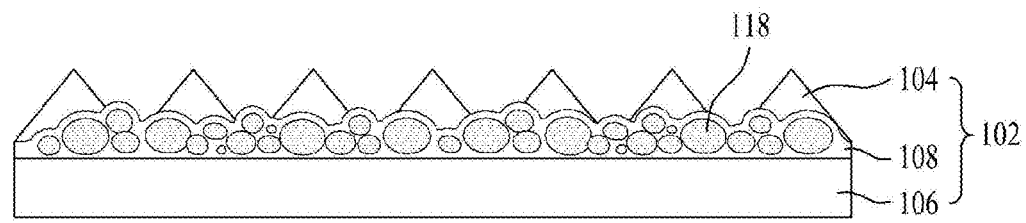

Referring to FIGS. 16A and 16B, the prism sheet 102 further includes a diffusion layer 108 having beads 118, for diffusion of the light incident on the prism sheet 102.

Figure 16C:
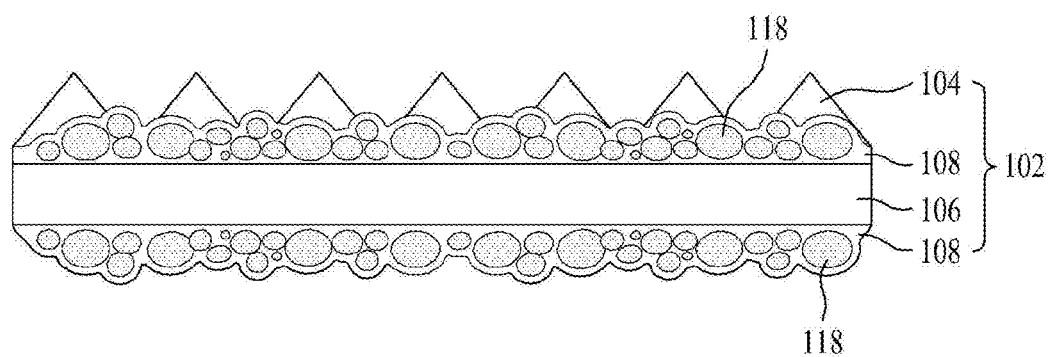
Figure 16D:
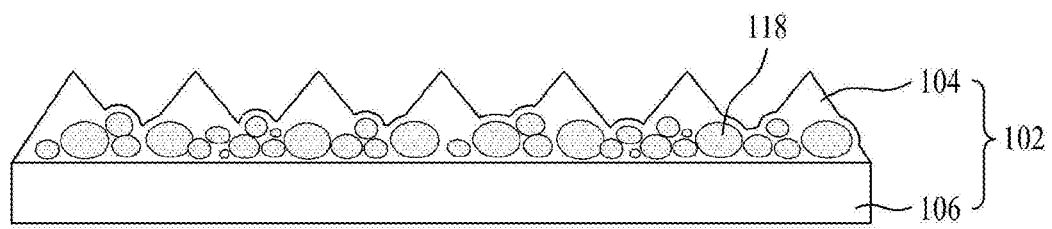

In detail, the diffusion layer 108 in FIG. 16A is formed on a backside of the base film 106 of the prism sheet 102, and the diffusion layer 108 in FIG. 16B is formed on a front side of the base film 106 of the prism sheet 102. The diffusion layer 108 in FIG. 16C is formed on a backside and a front side of the base film 106 of the prism sheet 102. The diffusion layer 108 in FIG. 16D is formed of a material the same with, and as one unit with, the prism portion 104 on at least one of a backside and a front side of the base film 106 of the prism sheet 102.

Thus, the backlight unit of the present invention shows the maximum brightness distribution at the viewing angle of zero which is vertical to the front of the light guide panel 130, with about 37% improvement over the related art backlight unit including the light guide panel having the ink pattern. Moreover, since the backlight unit of the present invention shows the maximum brightness distribution at the viewing angel of zero even without the related art diffusion sheet, a cost of the diffusion sheet can be saved, and since a total thickness of the backlight unit can be thinner, fabrication of a lighter and thinner liquid crystal display device is made possible.

Figure 17A:
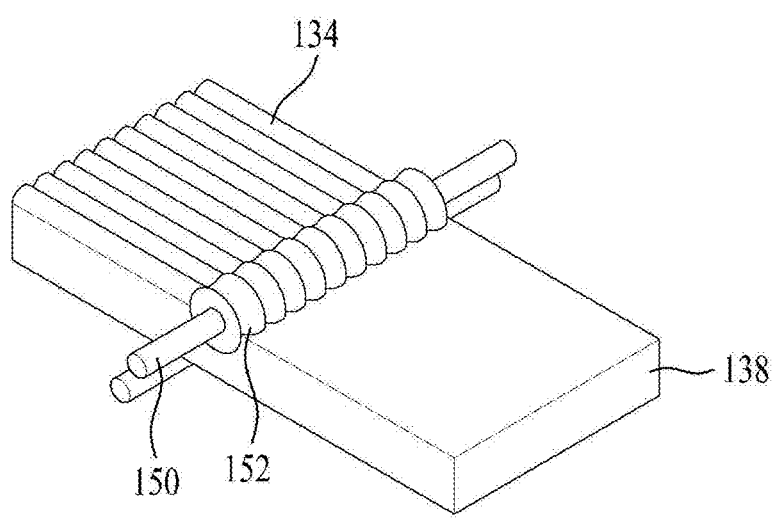
FIGS. 17A and 17B illustrate perspective views showing the steps of a method for fabricating a light guide panel in accordance with a first preferred embodiment of the present invention.
Figure 17B:
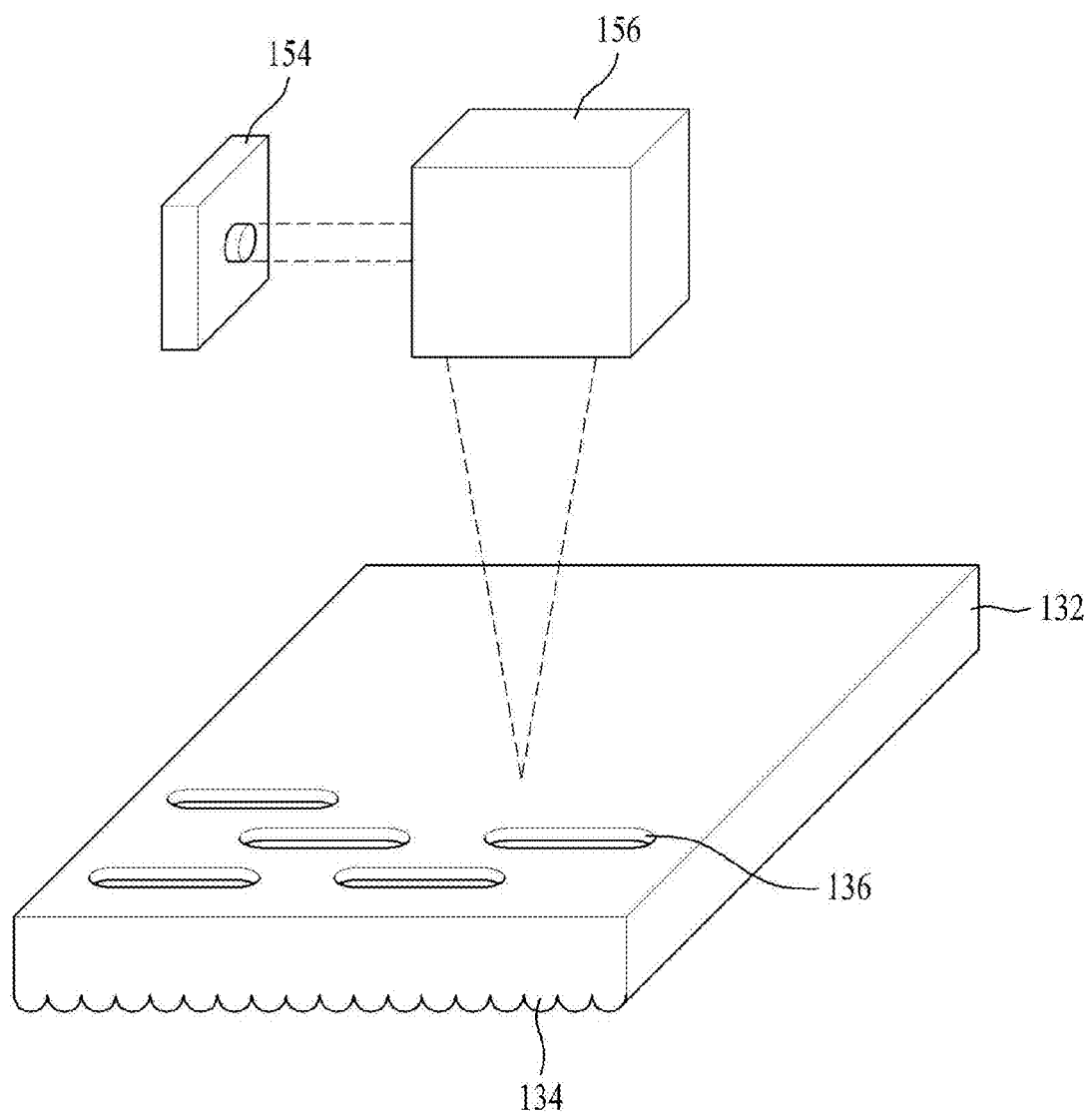

FIGS. 17A and 17B illustrate perspective views showing the steps of a method for fabricating a light guide panel in accordance with a first preferred embodiment of the present invention.

Referring to FIG. 17A, an extrusion roller 150 having concave recesses 152 is aligned on an extrusion plate 138 of a material, such as polymethylmethacrylate PMMA, which melts in laser machining. Then, the extrusion roller 150 is rotated on the extrusion plate 138 to form upper patterns 136 of lenticular shapes. The extrusion plate 138 having the upper patterns 136 formed thereon is transferred to a laser machine through a metal belt (not shown). Then, as shown in FIG. 17B, by directing a laser beam to a backside of the extrusion plate 138 with the laser machine having a laser generator 154 and a machining head 156, the lower patterns 136 are formed.

In detail, the laser generator 154 having a $CO_2$ laser emits the laser beam. The laser beam is incident on a machining head 156 having mirrors and focusing lenses from the laser generator 154, and the machining head 156 directs the laser beam to the backside of the extrusion plate 138 while moving in up/down and left/right directions, to form the lower patterns 136. In this instance, the machining head 156 moves at a speed of, for an example, 1~4 m/s, at a power output of 100~400 W.

Figure 18A:
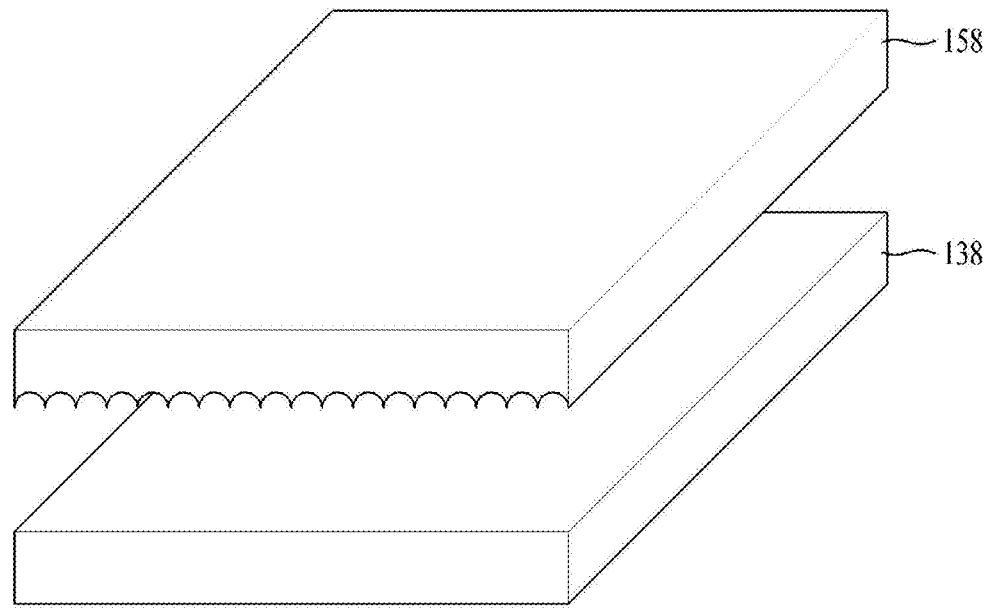
FIGS. 18A~18C illustrate perspective views showing the steps of a method for fabricating a light guide panel in accordance with a second preferred embodiment of the present invention.
Figure 18B:
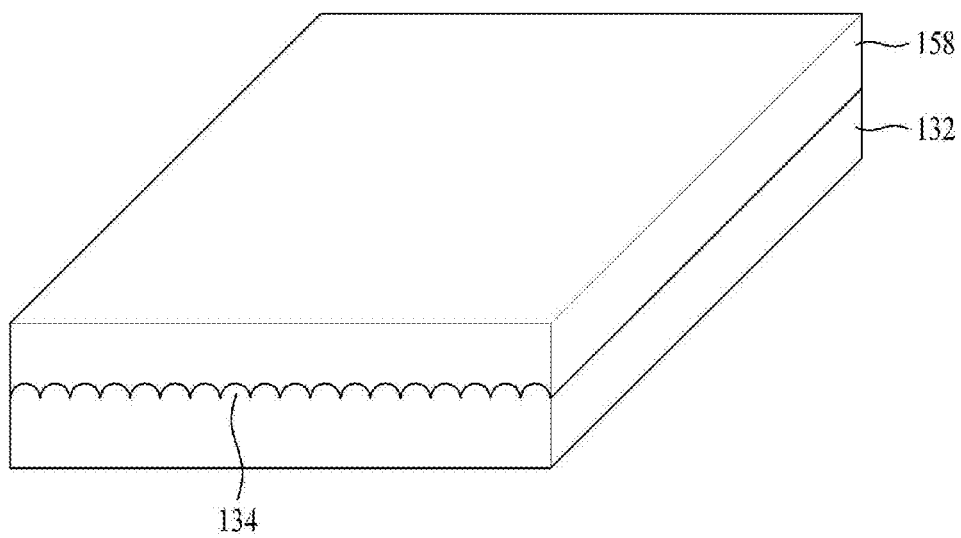
Figure 18C:
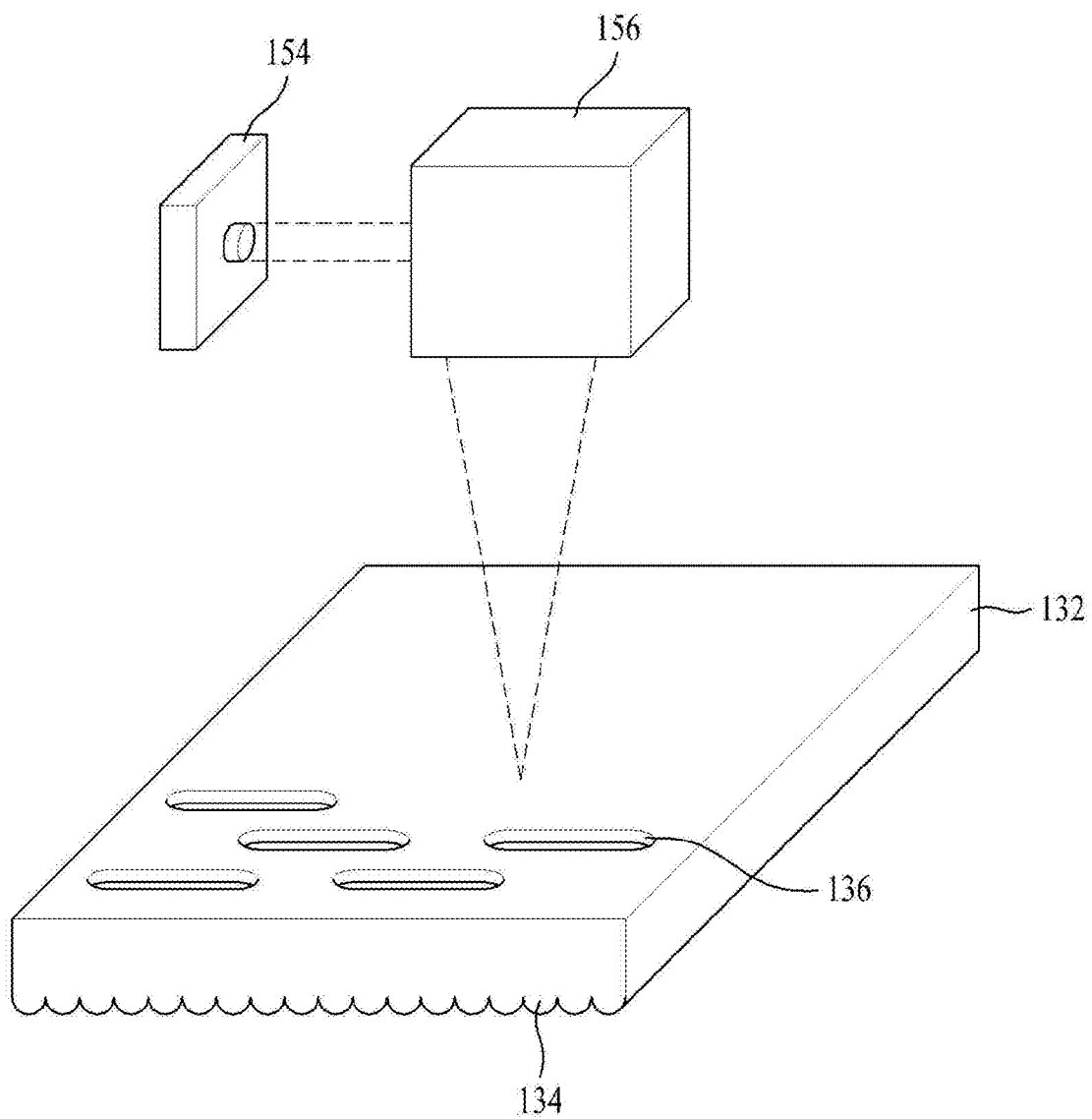

FIGS. 18A~18C illustrate perspective views showing the steps of a method for fabricating a light guide panel in accordance with a second preferred embodiment of the present invention.

Referring to FIG. 18A, an imprinting mold 158 having concave grooves are aligned over an extrusion plate 138. As shown in FIG. 18B, the extrusion plate 138 is pressed with the imprinting mold 158, to form upper patterns 134 of lenticular shapes which are inverted transcriptions of the grooves in the imprinting mold 158.

Then, referring to FIG. 18C, a laser beam is directed to a backside of the extrusion plate 138 by using a laser machine having a laser generator 154 and the machine head 156, to form lower patterns 136.

Figure 19:
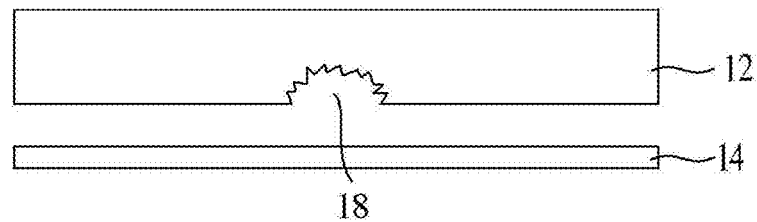
FIG. 19 illustrates a section of a light guide panel formed by a casting plate in the related art.

In the meantime, the extrusion plate which is a material of the light guide panel 130 has a molecular weight about 10 times lower than a casting plate which is a material of the related art light guide panel. In this case, since the casting plate with a relatively higher molecular weight has poor heat transfer, causing poor conversion of the laser energy directed to the casting plate into thermal energy, a surface of the lower pattern 18 is not smooth as shown in FIG. 19. Consequently, the related art light guide panel 12 of the casting plate has difficulty in adjusting the emission angle due to scattering of the light at the lower pattern 18, and can not obtain uniform brightness since a region at which scattering of the light at a surface thereof is heavy has a relatively large quantity of light loss.

Opposite to this, since the extrusion plate having a relatively low molecular weight has uniform heat transfer compared to the casting plate, enabling to convert the laser energy directed to the extrusion plate into thermal energy uniformly, the surface of the lower pattern can be formed smooth and flat. According to this, since the light is reflected or refracted at an inclined plane of the lower pattern 136 having a flat surface, enabling easy adjustment of the light emission angle, uniform brightness can be obtained.

Figure 20:
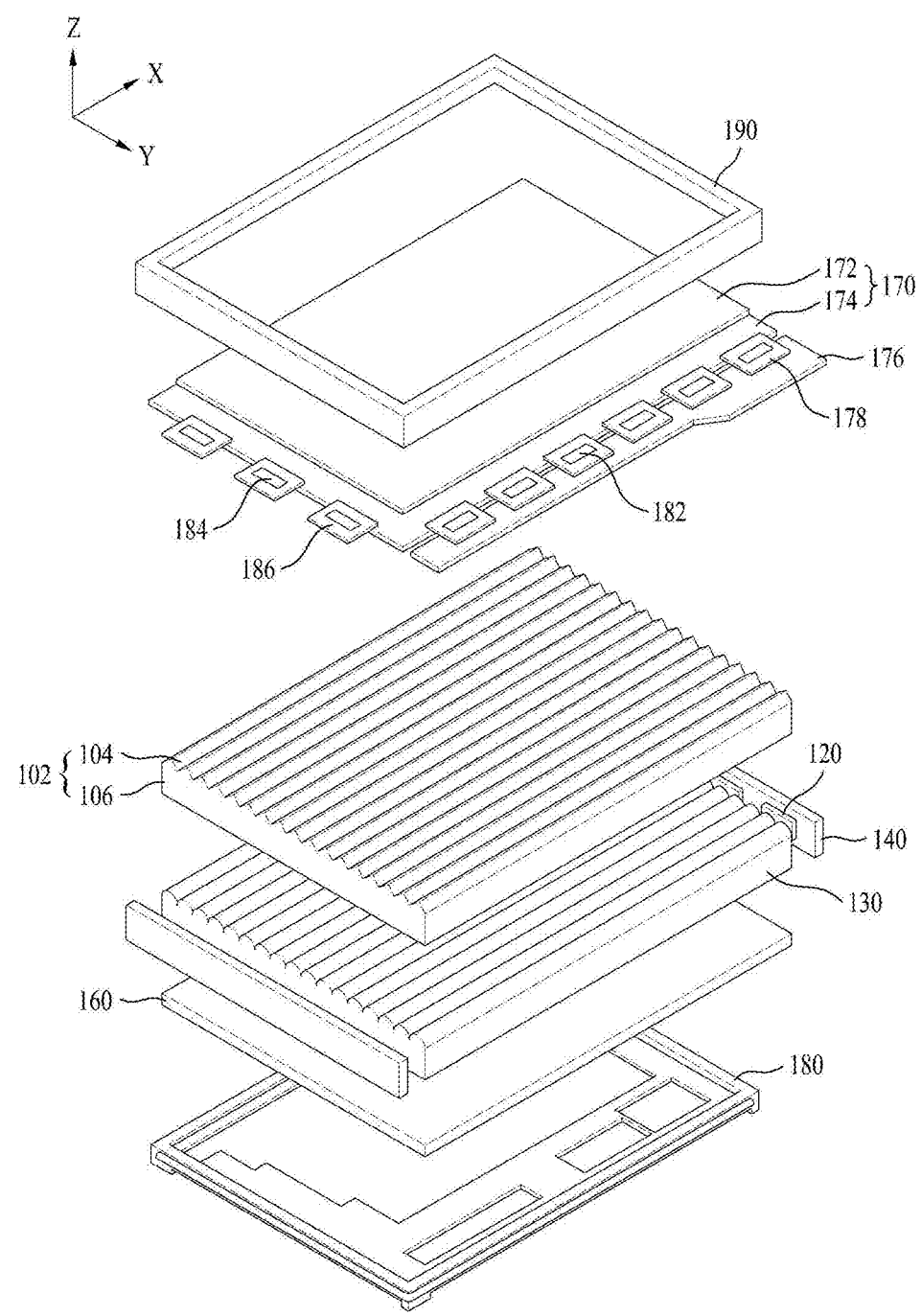
FIG. 20 illustrates a liquid crystal display device having the backlight unit in FIG. 12 applied thereto.

FIG. 20 illustrates a liquid crystal display device having the backlight unit of the present invention. The backlight unit in FIG. 20 will be described taking the backlight unit in FIG. 12 as an example.

The backlight unit is arranged under a liquid crystal panel 170, for providing a light to the liquid crystal panel 170. For this, as shown in FIG. 12, the backlight unit includes a light source 120, a light guide panel 130, a reflective sheet 160, and a prism sheet 102. In this instance, the light guide panel 130 of the backlight unit of the present invention includes an upper pattern arranged parallel to a long axis direction of the liquid crystal panel 170, i.e., arranged parallel to gate lines of the liquid crystal panel 170, and a lower pattern arranged parallel to a short axis direction of the liquid crystal panel 170. The light guide panel 130 has a light emission angle of zero degree which is vertical to a light emission angle of the light guide panel 130 even if the backlight unit has no diffusion sheet. Accordingly, since the backlight unit of the present invention does not require optical sheets, such as the related art diffusion sheet, to be positioned on the light guide panel 130, a cost of the backlight unit can be saved.

The liquid crystal panel 170 is arranged on the backlight unit, and seated on a support main 180. In this instance, the liquid crystal panel 170 can be fastened to the support main 180 by a top cover 190 fastened to the support main 180 with hooks and/or screws. In this instance, the support main 180 not only seats the liquid crystal panel 170 thereon, but also houses the backlight unit.

The liquid crystal panel 170 produces a picture by using the light emitted through the light guide panel 130. For this, the liquid crystal panel 170 can include a color filter substrate 172 and a thin film transistor substrate 174 faced to each other with liquid crystals disposed therebetween. Gate lines formed on the thin film transistor substrate 174 are driven by a gate signal generated by a gate driver integrated circuit 184 mounted on a gate tape carrier package TCP 186. And, data lines formed on the thin film transistor substrate 174 are driven by a data signal generated by a data driver integrated circuit 182 mounted on a data tape carrier package 178. And, the data tape carrier package 178 is attached to a printed circuit board 176 having a timing controller, a power source unit, and various circuits mounted thereto for supplying different signals required for producing the picture to the gate driver integrated circuit 184 and the data driver integrated circuit 182.

As has been described, the apparatus for fabricating a light guide panel, and a backlight unit having the light guide panel of the present invention have the following advantages.

The light guide panel of the present invention has a prismatic lower pattern having a rounded vertical angle formed by laser machining, and an upper pattern formed in relief by extrusion. Accordingly, the light guide panel of the present invention can improve brightness of the backlight unit more than 15% of the brightness of the related art backlight unit by adjusting an inclined plane angle of the lower pattern even without the prism sheet and the diffusion sheet. Accordingly, since the light guide panel of the present invention can dispense with the prism sheet and the diffusion sheet, the light guide panel of the present invention can save a cost and enables to fabricate a lighter and thinner liquid crystal display device.

Moreover, since the inclined plane of the lower pattern of the present invention is formed flat and smooth, making the light to travel to the upper pattern by reflecting or refracting the light, the backlight unit of the present invention permits to obtain uniform brightness compared to a related art system in which the light is made to travel toward the upper pattern by scattering the light.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
   a light source configured to generate a light;
   a light guide panel configured to guide the light incident thereon from the light source, the light guide panel having an upper pattern which is formed on a front side thereof for emitting the light guided thus upwards and a lower pattern which is formed on a backside thereof for reflecting or refracting the light; and
   a prism sheet on a front of the light guide panel,
   wherein the lower pattern of the light guide panel is formed in an intaglio pattern to be recessed into the light guide panel, and having a vertical angle at which two inclined planes meet, and one of the two inclined planes the light from the light source incident thereon has an angle of 45~55°,
   wherein the prism sheet includes:
   a base film; and
   a prism portion formed on a front of the base film having a continuous arrangement of mountain patterns and valley patterns arranged parallel to the upper pattern of the light guide panel, and
   wherein the light guide panel includes a plurality of lower patterns,
   the plurality of lower patterns are arranged in one of zigzag pattern and a line pattern, and
   a ratio of a height of the lower pattern to a width of the lower pattern is 0.2~0.5.

2. The backlight unit as claimed in claim 1, wherein the lower pattern is formed to have a smooth and flat surface by directing a laser beam to an extrusion plate.

3. The backlight unit as claimed in claim 1, wherein the lower pattern has a length of 600-800 μm, the width of 50-300 μm, and the height of 50-150 μm.

4. The backlight unit as claimed in claim 1, wherein the inclined planes of the lower pattern are arranged perpendicular to a direction of travel of the light in the light guide panel, and a length direction of the lower pattern is parallel to a direction of arrangement of the light source.

5. The backlight unit as claimed in claim 1, wherein the upper pattern is formed in a lenticular shape perpendicular to the length direction of the lower pattern, and has a ratio of a height to a width of 0.06~0.99.

6. The backlight unit as claimed in claim 1, wherein the plurality of lower patterns are fanned to have a concentration which becomes the higher as the lower patterns go the farther from the light source.

7. The backlight unit as claimed in claim 6, wherein, when the light source is positioned on one side of the light guide panel, a spacing of the lower patterns becomes the smaller as the plurality of lower patterns go from a light incident portion of the light guide panel to a light facing portion of the light guide panel, and when the light source is positioned on opposite sides of the light guide panel, the spacing of the plurality of lower patterns becomes the smaller as the plurality of lower patterns go from the opposite sides of the light guide panel to a middle portion of the light guide panel.

8. The backlight unit as claimed in claim 1, wherein the mountain patterns and valley patterns each have a vertical angle of 85~95°.

9. The backlight unit as claimed in claim 8, wherein the mountain pattern has a pointed or rounded peak.

10. The backlight unit as claimed in claim 8, wherein the prism portion includes at least two mountain patterns having shapes different from each other.

11. The backlight unit as claimed in claim 8, wherein the prism portion is formed of photo-setting resin having a liquid refractive index of 1.55~1.65.

12. The backlight unit as claimed in claim 8, wherein at least any one of the two inclined planes of the mountain pattern is formed to have an angle of 0-45° to at least any one of the inclined planes of the upper pattern.

13. The backlight unit as claimed in claim 1, further comprising a diffusion layer on at least one of a front side and a back side of the base film, the diffusion layer including a plurality of beads that diffuse the light incident thereon from the light source.

* * * * *